United States Patent
Beinert et al.

(10) Patent No.: US 10,451,061 B2
(45) Date of Patent: Oct. 22, 2019

(54) COMPRESSOR HAVING NON-CONTACT AND CONTACT SEALS

(71) Applicant: Ingersoll-Rand Company, Davidson, NC (US)

(72) Inventors: Michael Beinert, Dortmund (DE); Jan Hauser, Dortmund (DE); Philipp Schulze-Beckinghausen, Oberhausen (DE); Sven Herlemann, Datteln (DE)

(73) Assignee: Ingersoll-Rand Company, Davidson, NC (US)

( * ) Notice: Subject to any disclaimer, the term of this patent is extended or adjusted under 35 U.S.C. 154(b) by 243 days.

(21) Appl. No.: 15/148,601

(22) Filed: May 6, 2016

(65) Prior Publication Data
US 2017/0321697 A1    Nov. 9, 2017

(51) Int. Cl.
| F04C 15/00 | (2006.01) |
| F04C 27/00 | (2006.01) |
| F16J 15/16 | (2006.01) |
| F16J 15/447 | (2006.01) |
| F04C 2/16 | (2006.01) |
| F16J 15/40 | (2006.01) |
| F04C 18/16 | (2006.01) |

(52) U.S. Cl.
CPC ............ *F04C 15/0034* (2013.01); *F04C 2/16* (2013.01); *F04C 15/008* (2013.01); *F04C 27/009* (2013.01); *F16J 15/164* (2013.01); *F16J 15/406* (2013.01); *F16J 15/4472* (2013.01); *F04C 18/16* (2013.01)

(58) Field of Classification Search
CPC .... F04C 15/0038; F04C 15/34; F04C 27/009; F16J 15/164
USPC ............................ 418/102, 104, 140, 141, 98
See application file for complete search history.

(56) References Cited

U.S. PATENT DOCUMENTS

| 3,975,123 A | | 8/1976 | Schibbye | |
| 4,329,126 A | * | 5/1982 | Nishimura | F04C 27/009 418/1 |
| 4,781,553 A | * | 11/1988 | Nomura | F04C 27/009 277/412 |
| 4,969,653 A | * | 11/1990 | Breen | F16J 15/3252 277/561 |
| 5,348,456 A | * | 9/1994 | Kun | F01C 1/16 277/318 |
| 5,641,280 A | | 6/1997 | Timuska | |

(Continued)

*Primary Examiner* — Deming Wan
(74) *Attorney, Agent, or Firm* — Taft Stettinius & Hollister LLP

(57) ABSTRACT

A compression system is disclosed having a compressor and a seal package including a non-contact seal and one or more radial shaft seals. In one form the non-contact seal is placed in proximity to a high pressure portion of the compressor. The offset of the non-contact seal from a shaft used to drive the compressor allows some amount of pressure reduced leakage air to pass. A radial shaft seal is coupled to the shaft axial aft of the non-contact seal on the other side of the compressor and oriented to discourage further passage of the leakage air past the radial shaft seal. A vent conveys leakage air to return to the compressor. A backup radial shaft seal can be used axially aft of the first radial shaft seal. A further radial shaft seal is disposed adjacent to the backup seal and oriented in the other direction to seal lubricant for a bearing.

21 Claims, 2 Drawing Sheets

(56) References Cited

U.S. PATENT DOCUMENTS

| | | | |
|---|---|---|---|
| 5,836,753 A * | 11/1998 | Takei | F02B 33/36 |
| | | | 418/104 |
| 6,095,780 A * | 8/2000 | Ernens | F04C 27/009 |
| | | | 277/351 |
| 6,161,838 A * | 12/2000 | Balsells | F16J 15/3216 |
| | | | 277/511 |
| 6,287,100 B1 | 9/2001 | Achtelik et al. | |
| 6,416,302 B1 | 7/2002 | Achtelik et al. | |
| 7,713,039 B2 | 5/2010 | Achtelik et al. | |
| 8,529,234 B2 | 9/2013 | Yoshimura et al. | |
| 8,556,606 B2 | 10/2013 | Noguchi | |
| 2010/0013167 A1 * | 1/2010 | Bachhofner | F16J 15/004 |
| | | | 277/558 |

* cited by examiner

COMPRESSOR HAVING NON-CONTACT AND CONTACT SEALS

TECHNICAL FIELD

The present invention generally relates to sealing compression systems, and more particularly, but not exclusively, to sealing compression systems with a combination of contact and non-contact seals.

BACKGROUND

Providing compressor systems with adequate sealing packages remains an area of interest. Some existing systems have various shortcomings relative to certain applications. Accordingly, there remains a need for further contributions in this area of technology.

SUMMARY

One embodiment of the present invention is a unique compressor having primary and secondary seals. Other embodiments include apparatuses, systems, devices, hardware, methods, and combinations for sealing a compressor and maintaining compressor fluid and lubricant fluid separate from one another through a combination of seals. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
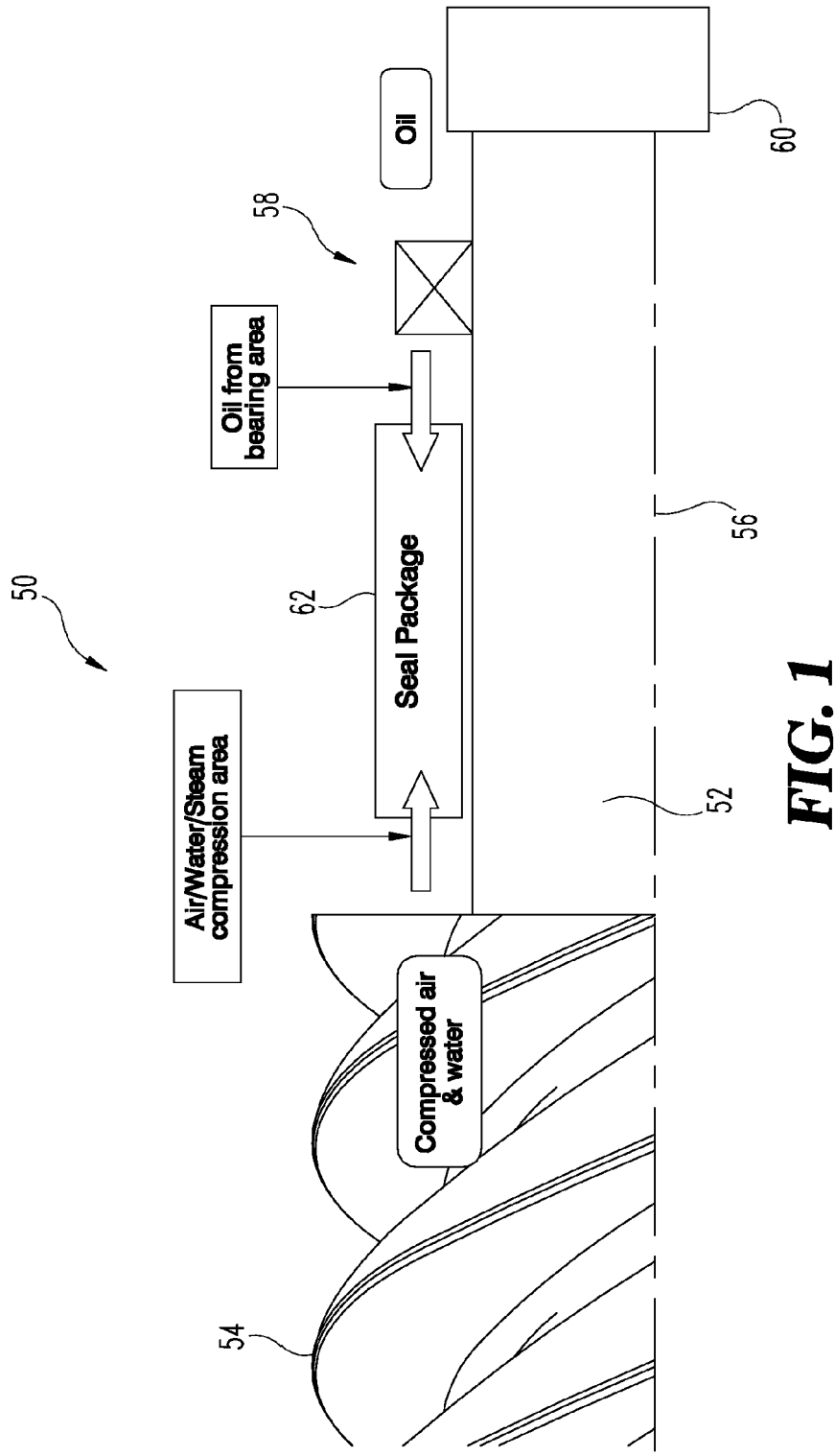
FIG. 1 discloses a compressor and seal system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated one embodiment of a compression system 50 which includes a shaft 52 driven compressor 54 which is driven about a centerline 56 and is supported by a bearing 58. The compressor 54 is powered by a prime mover 60 to rotate about the centerline 56. A seal package 62 is disposed between the compressor 54 and the bearing 58 to provide sealing of one or both of the compressor 54 and bearing 58. In one form the seal package 62 includes provisions to discourage conveyance of moisture and/or other fluids/particulate/debris from the compressor 54 to the bearing 58, as well as lubricant from the bearing 58 to the compressor 54. Seal packages of this nature have been used in prior devices.

As shown in the illustrated embodiment, the compressor 54 is depicted as a screw compressor, but it will be appreciated that other types of compressors 54 are also contemplated herein. In general the compressor 54 can be any type of device that produces a rise in pressure (static, dynamic, and/or total) of a fluid. These embodiments disclosed herein can be used in many different types of applications, such as but not limited to an air compressor, refrigerant compressor, air blower, etc. The compressor 54 can take the form of a wet or a dry compressor. For example, in one non-limiting embodiment the compressor 54 is a water spray injected screw compressor.

The bearing 58 in the illustrated embodiment is depicted in schematic form. In general the bearing 58 can be any type of bearing device, including a rolling element bearing, fluid bearing, magnetic bearing, and a plain bearing, among potential others. In just one non-limiting example, the bearing 58 can be a cylindrical roller bearing. In some non-limiting forms the bearing can be a thrust bearing or radial bearing. Whichever the form, in many applications the bearing itself will be lubricated with a bearing lubricant. Such a lubricant can take many forms, such as but not limited to a liquid oil type lubricant that can be sprayed or splashed upon the bearing, if at all.

The prime mover 60 can be any type of device which supplies motive power to the compressor 54, and can take any variety of forms such as an electric motor, an internal combustion engine, etc. Although illustrated in schematic form, the prime mover 60 can provide motive power to the shaft 52 through any variety of intermediate shafts, gears, etc beyond the direct connection illustrated in FIG. 1.

Figure 2:
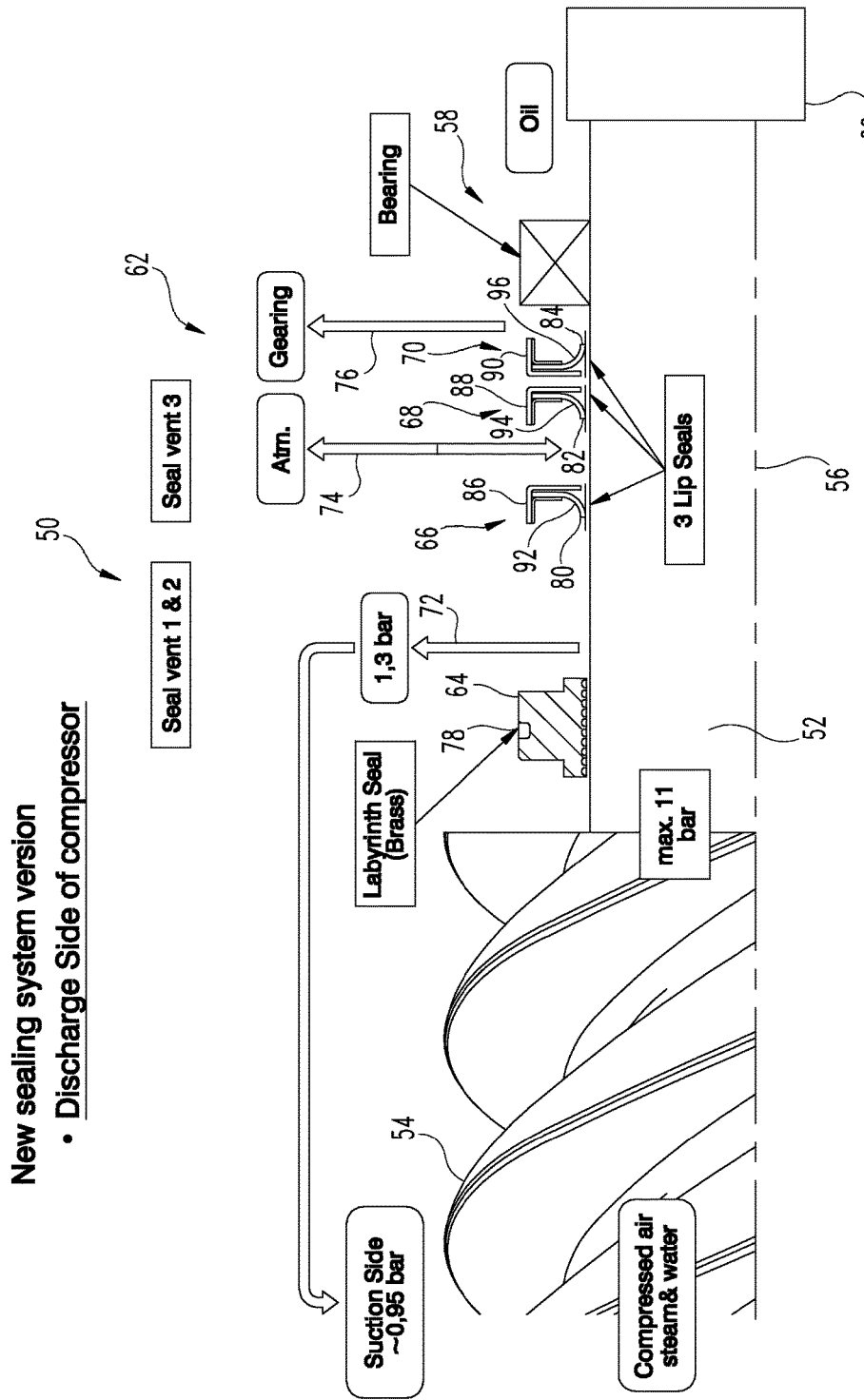
FIG. 2 discloses a compressor having non-contact seal and radial shaft seals.

Turning now to FIG. 2, an embodiment of the compression system 50 is disclosed which includes further details of the seal package 62. The seal package 62 can include a non-contact seal 64, a series of radial shaft seals 66, 68, and 70, as well as the bearing 58. Also depicted in FIG. 2 are a series of passages 72, 74, and 76 that can be structured as vents to convey fluid within the passage to another location that serves a venting purpose. In other additional and/or alternative embodiments, the passages 72, 74, and/or 76 can be structured as a passage that conveys fluid to another location but otherwise retains it within a functional system. Further details of the passages 72, 74, and 76 will be provided below.

The non-contact seals 64 can be labyrinth seal, spiral seal, etc. For example the seal can include any number of protrusions or undulations, whether periodic or not, and whether arranged systematically or not, that discourage the conveyance of fluid therethrough. In some forms the non-contact seal can take on the form of a helical groove, while in others it can include separate circumferential protrusions axially offset from one another. Other forms are contemplated herein. Owing to their nature the non-contact seal may not be able to utterly prohibit the conveyance of all fluid past the seal, but the size, arrangement, and orientation may nevertheless discourage quite a bit of fluid from being passed through the seal. The non-contact seal 64 can be formed and installed in the compression system 50 in a variety of manners. For example, the non-contact seal 64 can be made of a variety of materials including, but not limited to, brass. It can be formed cast into near net form, or can additionally and/or alternatively be formed from a machining operation. Although not illustrated for ease of convenience, it will be appreciated by those of skill in the art that various supporting structures are nevertheless sued to abut certain elements of the compression system, for example the non-contact seal 64, to complete assembly of the compression system 50. For example, the non-contact seal 64 can include a gasket, O-ring, other device to assist in sealing the system. In one non-limiting form, gasket 78 is shown illustrated in FIG. 2 on top of the non-contact seal 64 and is used to seal against other supporting structure which is not illustrated (again, for ease of convenience).

The radial shaft seals 66, 68, and 70, also sometimes referred to as lip seals, can be used in applications where flow of material from one side of the seal to the other is permitted or at least tolerated, but flow of material in the other direction is discouraged and not wanted. Uses of such seals could permit retention of fluid/debris on a first side of the seal but otherwise allow venting from a second side to the first side of the seal during overpressure conditions on the other (among other reasons). Though three seals are present, fewer or additional lip seals can also be used.

Such lip seals can include one or more lip portions 80, 82, 84 that have protruding tip portions extending along an axial direction of the shaft 52. The protruding tip portions can generally include an apex at the end of opposing sides, one side of which is in proximity and/or contacts the shaft 52. The end can be pointed, blunt, or take on any variety of shapes. The sides leading to the tip portion can be curved in some embodiments (as depicted in FIG. 2), can be straight, or can take on any variety of forms. One or more parts of the protruding lip portions of the seals 66, 68, and 70 (such as but not limited to the sides leading to an end of the seal) will generally contact the shaft 52 during operation of the compression system 50. Such contact can occur through a range of speeds, sometimes very high speeds, associated with operation of a compression system 50, such as speeds that might be used with a screw compressor.

In some embodiments the lip seals 66, 68, and 70 can include relatively rigid portions 86, 88, and 90 as well as compliant portions 92, 94, and 96. The rigid portions 86, 88, and 90 can be structured to bear loads and provide mounting interface for the seals 66, 68, and 70 to other portions of the compression system 50 not shown in the figure, as well as can be structured to provide internal support for the compliant portions 92, 94, and 96. As shown in the illustrated embodiment, the rigid portions 86, 88, and 90 can be used to 'sandwich' a portion of the compliant portions 92, 94, and 96 to anchor those portions to the seal. The compliant portions 92, 94, and 96 can include the lip portions referred to above.

The terms 'rigid' and 'compliant' are used herein for ease of description, they are used in a relative sense between the components to which they each describe (e.g. one component may be considered rigid relative when compared to a component that includes more compliance), and are not intended to be limiting beyond that context unless otherwise stated.

Though the lip seals 66, 68, and 70 shown in the illustrated embodiment include an integrated assembly of compliant portions 92, 94, and 96 along with support portions 86, 88, and 90, in some forms the lip seals can be made predominately out of a single material such that the lip portion is integral with any structural support portion of the lip seal. In some additional and/or alternative embodiments, the lip portion can be integrated with the structural support portion whether or not each is made out of the same material. In those embodiments where the lip portion is integrated with the structural support portion, such integration can but need not occur separate from the shaft and bearing assembly shown in FIG. 2. For example, the lip portion and associated material can be formed in situ upon the structural support portion in a manufacturing process that is separate from and which occurs irrespective of the shaft and bearing assembly. When integrated with the separate lip portion, the support portion can form an exterior surface of the integrated lip seal (as shown in FIG. 2), or can be imbedded therein. In short, any variety of configurations, manners of making, and material compositions are contemplated for the lip seal.

Any of the lip seals 66, 68, and 70 can be identical to any of the other seals in configuration, geometry, size, and material type. However, not all seals need be identical to each other. In some forms, the pair of lip seals 66 and 68 are identical in this way with the lip seal 70 being different in at least one of geometry, size, and material type. In still other additional forms, the pair of lip seals 66 and 68 and the bearing side lip seal 70 can be identical to one another (albeit perhaps oriented in different directions). In some embodiments of the instant application, at least one of the pair of lip seals 66 and 68 and bearing side lip seal 70 can be different from the other in any one or more of configuration, geometry, size, and material type.

Any or all portions of the lip seals 66, 68, and 70 can be made out of a variety of materials. In one nonlimiting embodiment, the lip seal(s) can include Polytetrafluoroethylene (PTFE) material. Such PTFE material can be used on or as the compliant portions 92, 94, and 96. For example, the PTFE material can be used as a coating on a substrate material, or can constitute the structure itself (e.g. the compliant portion can be made of PTFE material). The PTFE material can constitute all or just a portion of the lip seals.

The lip seals 66 and 68 can be oriented such that the lip portions point in the same direction toward the compressor 54. Such orientation can be used to discourage fluid that has leaked past the non-contact seal 64 from intruding into one or more of the passages 74 and 76. The lip seal 68 can be used as a backup to the lip seal 66. In this way, if fluid from the compressor side of lip seal 66 seeps past the seal, the passage 74 can be used as an indicator whether this has happened, all while the lip seal 68 maintains its integrity to further prevent such leakage to the bearing 58. Monitoring of the system in this way can provide early detection of problems before further substantial issues arise.

The lip seal 70 is depicted as oriented in the opposite direction from the other lip seals so as to prevent/discourage lubrication from the bearing 58 from intruding to one or more of the passages 76 and 74.

The passages 72, 74, and 76 can be routed to any location. In the illustrated embodiment, passage 72 functions as a vent to convey leakage air to a suction side of the compressor 54. Passage 74 can function as a vent to atmospheric conditions. Passage 76 can convey lubricant to other portions of the bearing 58 and/or other portions of a lubrication system. Such passages as used herein can include one or more portions of an annular flow path(s), conduits, tubing, etc that together form a passage (such as a vent passage) for the conveyance of a fluid.

As used herein, the terms "fore" and "aft" are used for convenience of reference and are not intended to be limiting as to any particular implementation of the application. For example, reference to structure within this application as being "aft" of another structure may be unrelated to whether the particular structure would be considered "aft" in any given installation. Thus, the terms are only intended to convey a relative spatial relationship, not an absolute relationship.

One aspect of the present application provides an apparatus comprising a rotatable shaft coupled to a fluid moving component which is structured to produce a change in pressure in the fluid, a non-contact seal disposed about the rotatable shaft and structured to discourage movement of the fluid therethrough, the non-contact seal having an upstream axial side corresponding to a side on which the fluid moving component is disposed and a downstream axial side corresponding to the side opposite the fluid moving component side, the non-contact seal producing a pressure drop in the fluid when the fluid flows through an annular space formed between the non-contact seal and the shaft, a primary lip seal disposed about the rotatable shaft and axially offset from the non-contact seal on the downstream axial side, the primary lip seal having a protruding lip extension that is turned to point to the downstream axial side of the non-contact seal, a vent structured to receive fluid located between and in contact with the non-contact seal and the primary lip seal after the fluid having traversed the annular space, the vent configured to return the fluid to the fluid moving component, and a secondary lip seal disposed about the rotatable shaft and adjacent to the primary lip seal.

A feature of the present application wherein the non-contact seal is a labyrinth seal, and wherein the primary lip seal and the backup lip seal are each made of a material including PTFE.

Another feature of the present application includes wherein the vent conveys the fluid from the annular space to a relatively low pressure region of the fluid moving component.

Yet another feature of the present application includes wherein the secondary lip seal includes a protruding lip that extends toward the primary lip seal, and which further includes a bearing assembly structured to provide bearing loads for the rotatable shaft.

Still another feature of the present application further includes another lip seal disposed about the rotatable shaft and offset from the secondary lip seal, the another lip seal structured to discourage passage of lubricant from the bearing assembly.

Yet still another feature of the present application includes wherein the another lip seal includes an elongate lip having a tip and defined by a shaft contact side and a shaft non-contact side, the tip directed toward the bearing assembly, and which further includes an atmospheric vent in fluid communication with a space between the secondary lip seal and the another lip seal.

A further feature of the present application further includes a bearing vent in fluid communication with a space between the another lip seal and the bearing assembly and structured to convey a lubricant.

A yet further feature of the present application includes wherein the primary lip seal, the secondary lip seal, and the another seal each include a PTFE material.

Another aspect of the present application provides an apparatus comprising a compressor mounted to a shaft, a non-contact seal disposed at one end of the compressor and placed circumferentially around the shaft, a vent passage having a fluid flow path that begins on a side of the non-contact seal opposite the compressor, the vent structured to convey pressurized leak air that seeps past the non-contact seal, and a pair of lip seals disposed adjacent to each other and axially offset from the non-contact seal, the pair of lip seals forming an axial aft boundary of the beginning to the vent passage where the axially forward boundary of the beginning of the vent passage is formed by the non-contact seal, each of the pair of lip seals having respective lips projecting in the same direction to discourage further passage of the pressurized leak air and encourage the same to flow into the vent.

A feature of the present application includes wherein the pair of lip seals are identical in configuration.

Another feature of the present application includes wherein the materials from which the pair of lip seals are made include PTFE.

Still another feature of the present application further includes a lubricated bearing package disposed axially aft of the pair of lip seals.

Still yet another feature of the present application further includes a bearing side lip seal arranged adjacent to the lubricated bearing package and structured to discourage conveyance of lubrication past the seal and away from the lubricated bearing.

Yet still another feature of the present application includes wherein a lip of the bearing side lip seal includes a tip and adjacent sides that project toward the lubricated bearing package.

A further feature of the present application further includes a vent positioned between the pair of lip seals and the another lip seal, and wherein at least one of the pair of lip seals includes PTFE as a material.

Yet another feature of the present application includes a method comprising rotating a shaft upon which a compressor is coupled to pressurize a fluid, the compressor having a relatively low pressure region during operation and relatively high pressure discharge, sealing the shaft with a non-contact seal such that an annular offset is formed between the shaft and the non-contact seal, the annular offset permitting an amount of fluid to traverse therethrough with an accompanying pressure drop in the fluid, sealing the shaft with a first radial lip seal, venting the amount of fluid which collects in the space located between the non-contact seal and the first radial lip seal to the compressor such that the amount of fluid is reintroduced into the compressor, and sealing the shaft with a second radial lip seal disposed in a direction axially away from the compressor on an opposite side of the first radial lip seal.

A feature of the present application includes wherein the first radial lip seal is disposed adjacent to the second radial lip seal, and which further includes supporting the shaft with a bearing assembly located further than the second radial lip seal in the direction axially away from the compressor.

Another feature of the present application further includes sealing the shaft with a third radial lip seal, and which further includes venting a fluid that resides between the second radial lip seal and the third radial lip seal to ambient atmosphere.

Still another feature of the present application includes wherein the first and second radial lip seals are identical, wherein the bearing assembly includes a lubricant, wherein the third radial lip seal is oriented to discourage passage of the lubricant toward the second radial lip seal, and which further includes pointing the tips of the first and second radial lip seals in the direction toward the compressor.

Still yet another feature of the present application includes wherein the tips of each of the first and second radial lip seals point in the direction toward the compressor, the tip of the third radial lip seal points in the direction away from the compressor, and wherein the first, second, and third radial lip seals include a PTFE material.

A still further feature of the present application includes wherein the first and second radial lip seals are identical, and which further includes venting the bearing assembly.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Also unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method comprising:
   rotating a shaft upon which a compressor is coupled to pressurize a fluid, the compressor having a relatively low pressure region during operation and relatively high pressure discharge;
   sealing the shaft with a non-contact seal such that an annular offset is formed between the shaft and the non-contact seal, the annular offset permitting an amount of the fluid to traverse therethrough with an accompanying pressure drop in the fluid;
   sealing the shaft with a first radial lip seal;
   venting the amount of the fluid which collects in a space located between the non-contact seal and the first radial lip seal to the compressor such that the amount of the fluid is reintroduced into the compressor;
   sealing the shaft with a second radial lip seal disposed in a direction axially away from the compressor on an opposite side of the first radial lip seal, wherein tips of each of the first and second radial lip seals point in the direction toward the compressors and
   venting the fluid that resides between the first radial lip seal and the second radial lip seal to ambient atmosphere.

2. The method of claim 1, wherein the first radial lip seal is disposed adjacent to the second radial lip seal, and which further includes supporting the shaft with a bearing assembly located further than the second radial lip seal in the direction axially away from the compressor.

3. The method of claim 2, which further includes sealing the shaft with a third radial lip seal.

4. The method of claim 3, wherein the first and second radial lip seals are identical, wherein the bearing assembly includes a lubricant, wherein the third radial lip seal is oriented to discourage passage of the lubricant toward the second radial lip seal, and which further includes pointing the tips of the first and second radial lip seals in the direction toward the compressor.

5. The method of claim 3, wherein a tip of the third radial lip seal points in the direction away from the compressor, and wherein the first, second, and third radial lip seals include a PTFE material.

6. The method of claim 5, wherein the first and second radial lip seals are identical, and which further includes venting the bearing assembly.

7. An apparatus comprising:
   a compressor mounted to a shaft;
   a non-contact seal disposed at one end of the compressor and placed circumferentially around the shaft;
   a vent passage having a fluid flow path that begins on a side of the non-contact seal opposite the compressor, the vent passage structured to convey pressurized leak air that seeps past the non-contact seal;
   a pair of lip seals disposed adjacent to each other and axially offset from the non-contact seal, the pair of lip seals forming an axial aft boundary of the beginning to the vent passage where the axially forward boundary of the beginning of the vent passage is formed by the non-contact seal, each of the pair of lip seals having respective lips projecting in the same direction to discourage further passage of the pressurized leak air and encourage the same to flow into the vent passage; and
   an atmospheric vent positioned between the pair of lip seals.

8. The apparatus of claim 7, wherein the pair of lip seals are identical in configuration.

9. The apparatus of claim 8, wherein the materials from which the pair of lip seals are made include PTFE.

10. The apparatus of claim 7, which further includes a lubricated bearing package disposed axially aft of the pair of lip seals.

11. The apparatus of claim 10, which further includes a bearing side lip seal arranged adjacent to the lubricated bearing package and structured to discourage conveyance of lubrication past the bearing side lip seal and away from the lubricated bearing package.

12. The apparatus of claim 11, wherein a lip of the bearing side lip seal includes a tip and adjacent sides that project toward the lubricated bearing package.

13. The apparatus of claim 12, wherein at least one of the pair of lip seals includes PTFE as a material.

14. An apparatus comprising:
   a rotatable shaft coupled to a fluid moving component which is structured to produce a change in pressure in the fluid;
   a non-contact seal disposed about the rotatable shaft and structured to discourage movement of the fluid therethrough, the non-contact seal having an upstream axial side corresponding to a side on which the fluid moving component is disposed and a downstream axial side corresponding to the side opposite the fluid moving component side, the non-contact seal producing a pressure drop in the fluid when the fluid flows through an annular space formed between the non-contact seal and the rotatable shaft;
   a primary lip seal disposed about the rotatable shaft and axially offset from the non-contact seal on the downstream axial side, the primary lip seal having a protruding lip extension that is turned to point to the downstream axial side of the non-contact seal;
   a vent structured to receive the fluid located between and in contact with the non-contact seal and the primary lip seal after the fluid having traversed the annular space, the vent configured to return the fluid to the fluid moving component;
   a secondary lip seal disposed about the rotatable shaft and adjacent to the primary lip seal, the secondary lip seal including a protruding lip that extends toward the primary lip seal; and
   an atmospheric vent in fluid communication with a space between the primary lip seal and the secondary lip seal.

15. The apparatus of claim 14, wherein the non-contact seal is a labyrinth seal, and wherein the primary lip seal and the secondary lip seal are each made of a material including PTFE.

16. The apparatus of claim 1, wherein the vent conveys the fluid from the annular space to a relatively low pressure region of the fluid moving component.

17. The apparatus of claim 16, which further includes a bearing assembly structured to provide bearing loads for the rotatable shaft.

18. The apparatus of claim 17, which further includes another lip seal disposed about the rotatable shaft and offset from the secondary lip seal, the another lip seal structured to discourage passage of lubricant from the bearing assembly.

19. The apparatus of claim 18, wherein the another lip seal includes an elongate lip having a tip and defined by a shaft contact side and a shaft non-contact side, the tip directed toward the bearing assembly.

20. The apparatus of claim 19, which further includes a bearing vent in fluid communication with a space between the another lip seal and the bearing assembly and structured to convey a lubricant.

21. The apparatus of claim 20, wherein the primary lip seal, the secondary lip seal, and the another lip seal each include a PTFE material.

\* \* \* \* \*